(12) United States Patent
Zhang et al.

(10) Patent No.: US 8,511,187 B2
(45) Date of Patent: Aug. 20, 2013

(54) MOTION TRANSMITTING MECHANISM

(75) Inventors: Guo-Qing Zhang, Shenzhen (CN); Zhi-Ming Zhao, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 558 days.

(21) Appl. No.: 12/781,994

(22) Filed: May 18, 2010

(65) Prior Publication Data

US 2011/0232399 A1   Sep. 29, 2011

(30) Foreign Application Priority Data

Mar. 24, 2010 (CN) .......................... 2010 1 0131550

(51) Int. Cl.
*F16H 21/00*  (2006.01)
(52) U.S. Cl.
USPC .......................... 74/22 A; 74/490.04; 901/20
(58) Field of Classification Search
USPC ............... 74/22 A, 22 R, 25, 37, 63, 70, 82, 74/89.2, 89.22, 96, 665 GE, 490.03, 490.04; 901/19, 20, 21
See application file for complete search history.

(56) References Cited

U.S. PATENT DOCUMENTS

| | | | | |
|---|---|---|---|---|
| 1,921,402 A * | 8/1933 | Wiley | ............................ | 74/89.2 |
| 3,710,631 A * | 1/1973 | Gladow | ............................ | 74/89.2 |
| 4,170,146 A * | 10/1979 | Owens | ............................ | 74/89.2 |
| 4,351,197 A * | 9/1982 | Carson | ............................ | 74/89.22 |
| 4,353,262 A * | 10/1982 | Talbot | ............................ | 74/108 |
| 4,507,979 A * | 4/1985 | Zebrowski | ............................ | 74/89.22 |
| 4,775,907 A * | 10/1988 | Shtipelman | ............................ | 360/264.6 |
| 5,105,672 A * | 4/1992 | Carson et al. | ............................ | 74/89.22 |
| 5,399,091 A * | 3/1995 | Mitsumoto | ............................ | 434/61 |
| 5,429,015 A * | 7/1995 | Somes | ............................ | 74/665 B |
| 5,587,937 A * | 12/1996 | Massie et al. | ............................ | 703/7 |
| 6,077,027 A * | 6/2000 | Kawamura et al. | ............................ | 414/744.5 |
| 6,705,871 B1 * | 3/2004 | Bevirt et al. | ............................ | 434/262 |
| 7,249,951 B2 * | 7/2007 | Bevirt et al. | ............................ | 434/262 |
| 7,411,576 B2 * | 8/2008 | Massie et al. | ............................ | 345/156 |
| 2011/0124449 A1 * | 5/2011 | Zhou et al. | ............................ | 474/64 |

(Continued)

FOREIGN PATENT DOCUMENTS

JP   3-234495 A   10/1991
JP   03234494 A * 10/1991

(Continued)

OTHER PUBLICATIONS

Machine Translation of JP 06-226679.*

(Continued)

*Primary Examiner* — Bradley King
*Assistant Examiner* — Nicholas J Lane
(74) *Attorney, Agent, or Firm* — Altis Law Group, Inc.

(57) ABSTRACT

A deceleration mechanism comprises a driving member, a driven member, an actuator device connected to the driving member, and a transmission member coiling around the driving member and the driven member. The transmission member comprises a positioning portion and a coiling portion extending from opposite sides of the positioning portion. The position portion is fixed to the driving member, the coiling portion coils a plurality of windings on the driving member, and then coils on the driven member. The number of windings of the transmission member coiled around the driving member is equal to or more than the transmission ratio of the deceleration mechanism.

13 Claims, 5 Drawing Sheets

(56) References Cited

U.S. PATENT DOCUMENTS

2011/0155517 A1* 6/2011 Zhang et al. .................. 188/65.2
2011/0233007 A1* 9/2011 Zhao et al. ................... 188/65.1
2011/0290049 A1* 12/2011 Chen et al. ..................... 74/89.2

FOREIGN PATENT DOCUMENTS

| JP | 03234495 | A | * | 10/1991 |
| JP | 6-226679 | A |   | 8/1994 |
| JP | 06226679 | A | * | 8/1994 |

OTHER PUBLICATIONS

English-language abstract of JP 03-234495.*
English-language abstract of JP 03-234494.*

* cited by examiner

MOTION TRANSMITTING MECHANISM

BACKGROUND

1. Technical Field

The present disclosure generally relates to robotics and, particularly, to a motion transmitting mechanism used in a robot.

2. Description of Related Art

Motion transmitting mechanisms are widely used in industrial robotics and other applications. A motion transmitting mechanism often consists of a plurality of meshing gears with different diameters.

A commonly used motion transmitting mechanism includes an inner gear arranged in a shell, a crankshaft with an eccentrically rotating portion arranged in the shell, and a cycloidal gear sleeving on the eccentrically rotating portion. The cycloidal gear rotates about the eccentrically rotating portion, and the cycloidal gear not only meshes with the inner gear but also performs a revolution, and thereby generating an output speed lesser than the input rotating speed. However, to achieve higher degree of meshing and steadier output, the cycloidal gear of the motion transmitting mechanism frequently forms a plurality of tightly fitted gear teeth on its outer surface. When too many of the gear teeth are formed on a motion transmitting mechanism of reduced size, each gear tooth becomes very small, and clearance between neighboring gear teeth becomes also very small, thereby leading to overlapping interference between roots of the neighboring gear teeth. Therefore, the cycloidal gear and the gear teeth are very difficult to manufacture, presenting higher cost and a more complicated structure.

Therefore, there is room for improvement within the art.

BRIEF DESCRIPTION OF THE DRAWINGS

The components in the drawings are not necessarily drawn to scale, the emphasis instead being placed upon clearly illustrating the principles of the present disclosure. Moreover, in the drawings, like reference numerals designate corresponding parts throughout several views, and all the views are schematic.

DETAILED DESCRIPTION

Figure 1:
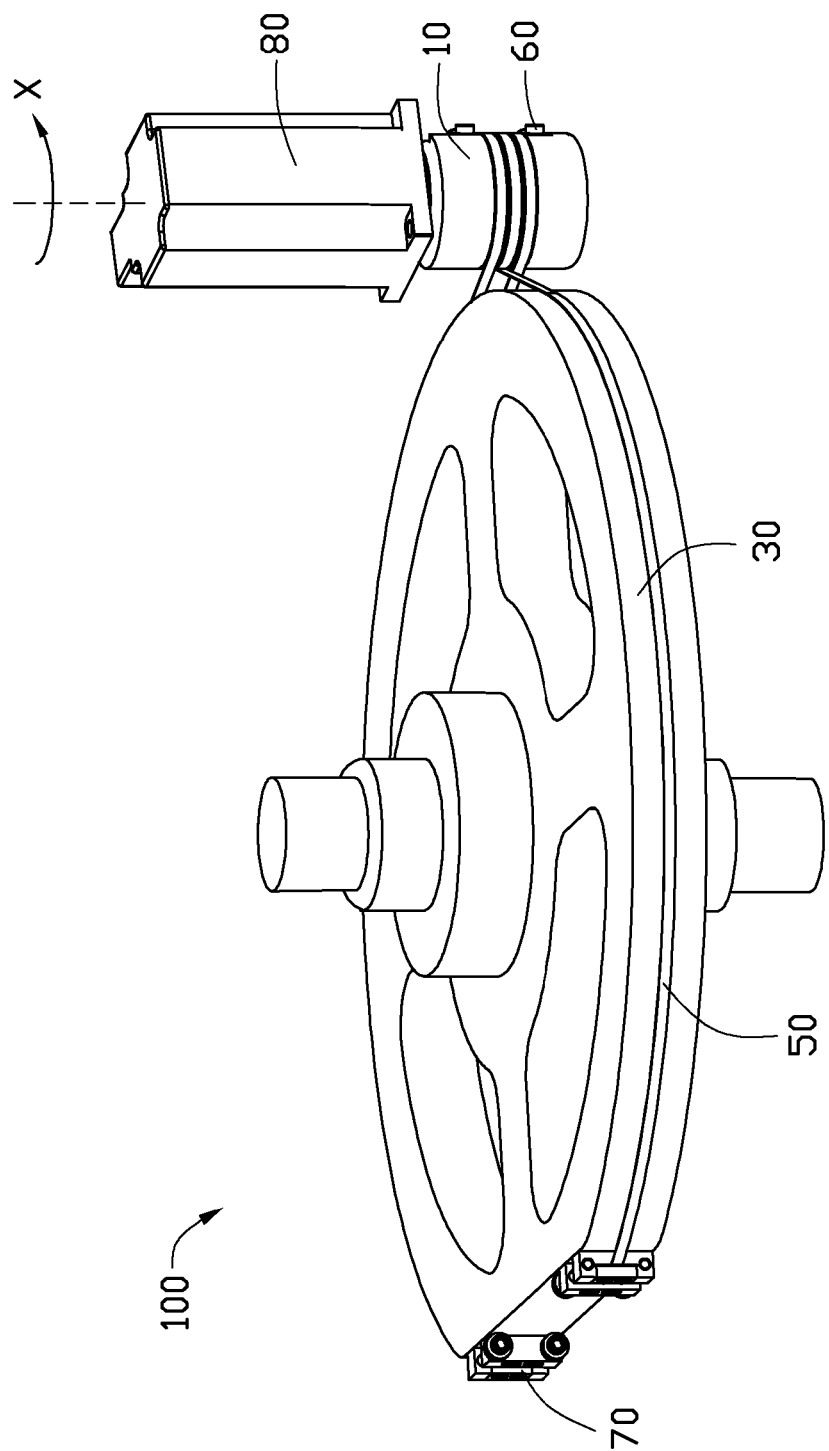
FIG. 1 is an assembled, isometric view of a motion transmitting mechanism as disclosed, including a driving member, a slave member, an actuator device, and a transmission member.

Referring to FIG. 1, a motion transmitting mechanism 100 used in a robot includes a driving member 10, a slave member 30, a transmission member 50, a plurality of fasteners 60, a plurality of fixing assemblies 70, and an actuator device 80. The transmission member 50 is coiled around the driving member 10 and the slave member 30. The fasteners 60 connect the transmission member 50 to the driving member 10. The fixing assemblies 70 connect the transmission member 50 to the slave member 30.

Figure 2:
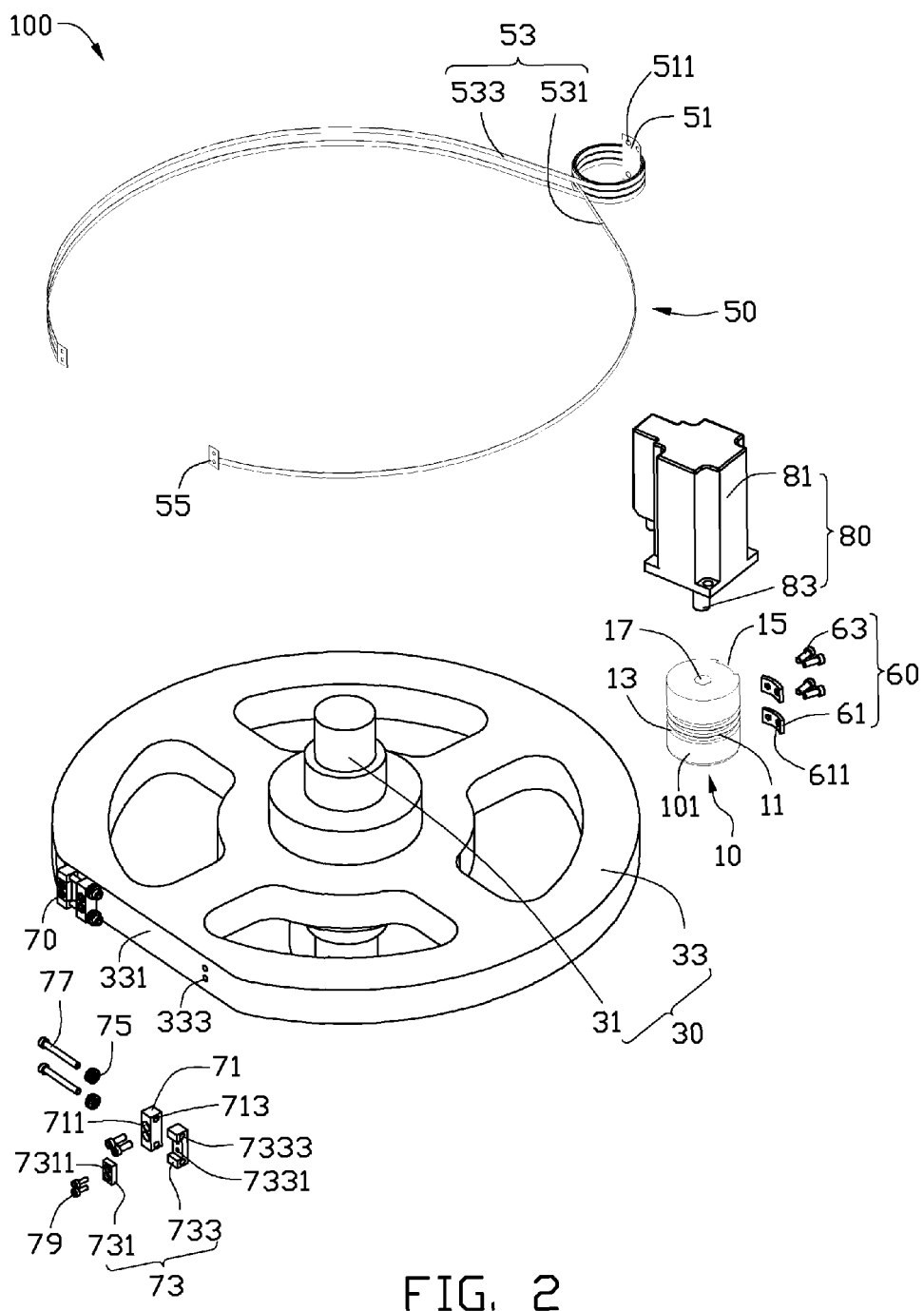
FIG. 2 is an exploded, isometric view of the motion transmitting mechanism of FIG. 1.
Figure 3:
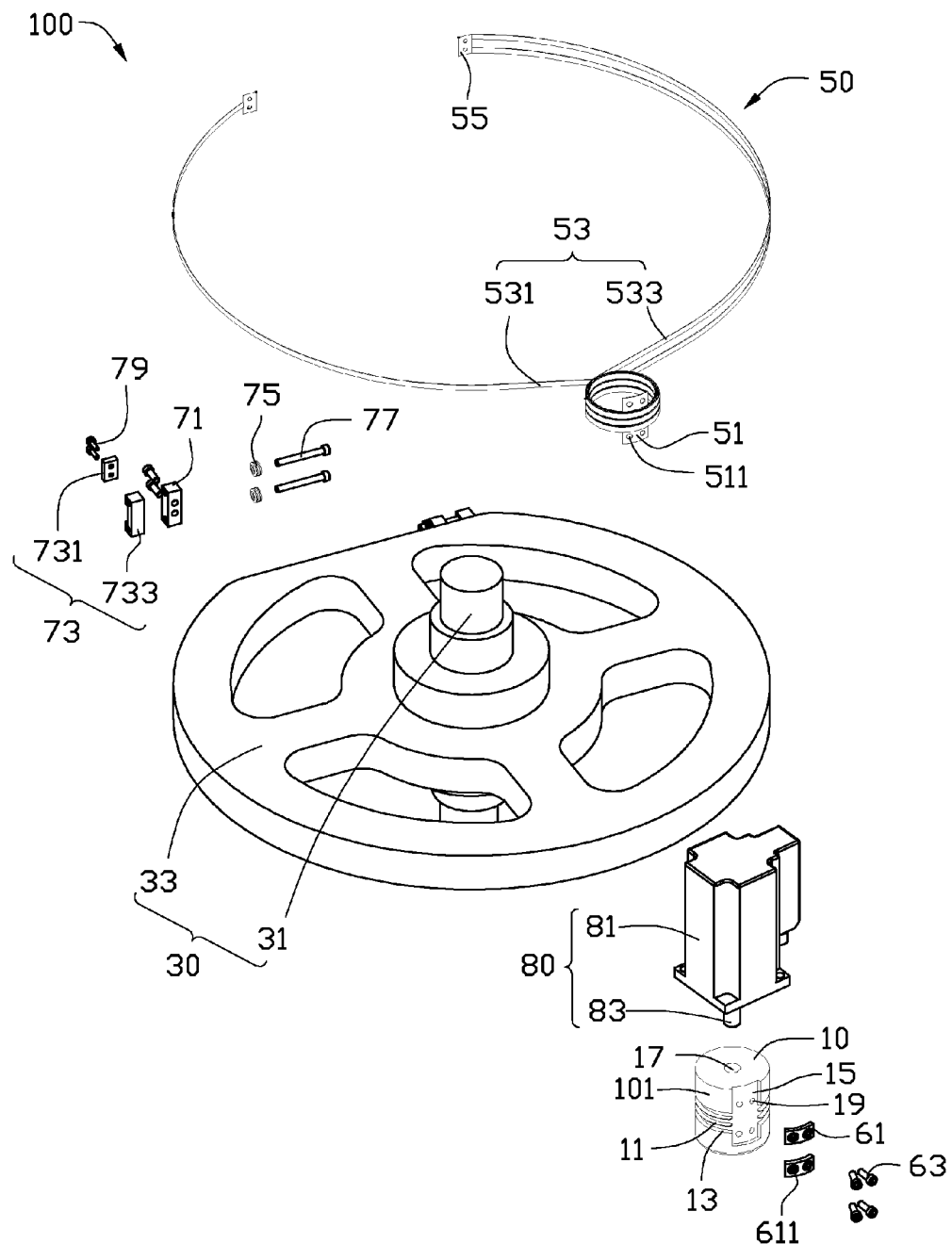
FIG. 3 is similar to the FIG. 2, but shows a view from another aspect.

Referring to FIGS. 2 and 3, the driving member 10 is substantially a cylinder, including an outer wall 101. The outer wall 101 defines a first receiving slot 11 and two second receiving slots 13 along a circumferential direction, and a fixing slot 15 along a radial direction. The driving member 10 further defines a shaft hole 17 from one end surface (not labeled) into the inside of the driving member 10 and a plurality of threaded holes 19 defined in the fixing slot 15 into the inside of the driving member 10. The first receiving slot 11 is arranged between the two second receiving slots 13 and is substantially parallel to the second receiving slots 13. Opposite ends of the first receiving slot 11 and the second receiving slots 13 communicate with the fixing slot 15.

The slave member 30 includes a slave shaft 31 and a slave wheel 33 rotatably sleeved on the slave shaft 31. The slave wheel 33 includes a fixing portion 331. The fixing portion 331 defines a plurality of fixing holes 333. The ratio of the diameter of the slave wheel 33 and the diameter of the driving member 10 is the transmission ratio of the motion transmitting mechanism 100.

Figure 4:
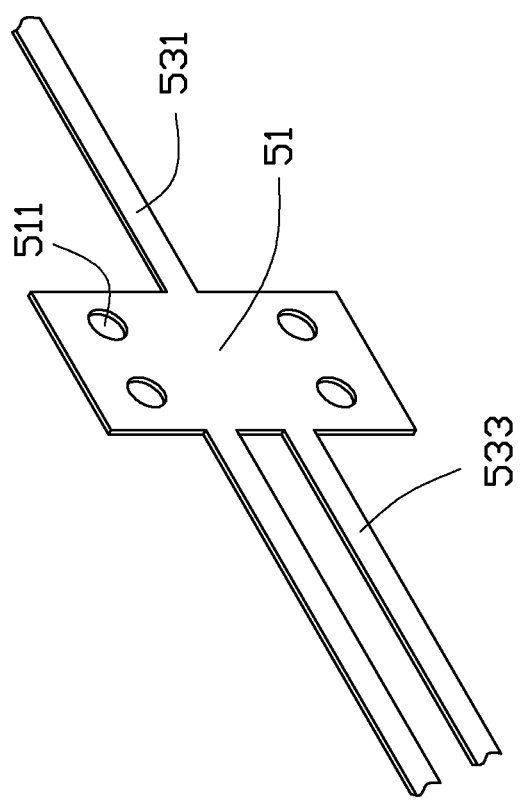
FIG. 4 is a partial isometric view showing a first state of a transmission member utilized by the motion transmitting mechanism of FIG. 1.
Figure 5:
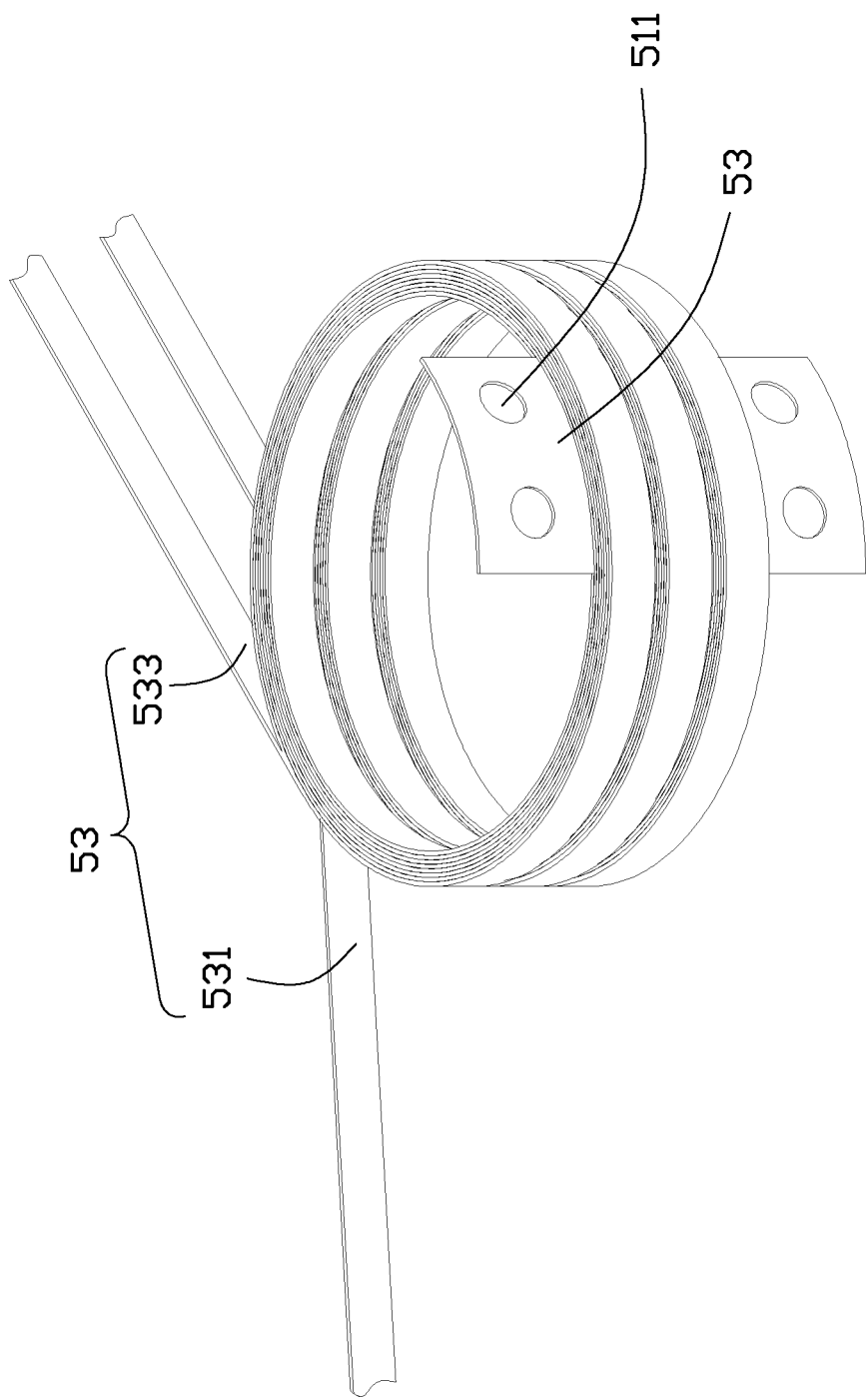
FIG. 5 is a partial isometric view of a second state of the transmission member of FIG. 4.

Referring to also FIGS. 3 and 4, each transmission member 50 includes a positioning portion 51, a coiling portion 53 extending from opposite edges of the positioning portion 51, and two connecting portions 55 formed at the ends of the coiling portion 53. The positioning portion 51 defines four connecting holes 511. The coiling portion 53 includes a first coiling belt 531 extending from one edge of the positioning portion 51 and two second coiling belts 533 from the opposite edge of the positioning portion 51. The first coiling belt 531 is arranged between the second coiling belts 533 and is parallel to the second coiling belts 533. The first coiling belt 531 and the second coiling belts 533 can have the same width or different widths. The distance between the second coiling belts 533 should be larger than the width of the first coiling belt 531 so as to make the first coiling belt 531 extend between the second coiling belts 533 without coming into contacting with them. In this illustrated embodiment, the width of the first coiling belt 531 is larger than the width of the second coiling belts 533, which is capable for counterbalancing the force during a transmission process. The width of the first receiving slot 11 of the driving member 10 receiving the first coiling belt 531 is larger than the width of the second receiving slots 13 of the driving member 10 receiving the second coiling belts 533 correspondingly. One connecting portion 55 is arranged at the end of the first coiling belt 531, and the other connecting portion 55 is arranged at the ends of the second coiling belts 533 and connects the ends of the second coiling belts 533. The transmission member 50 may be a wire cable, a steel belt, or other material having sufficient strength. In the illustrated embodiment, the transmission member 50 is a steel belt, capable of providing higher transmission precision, improved rigidity, and steadier transmission.

Referring to FIGS. 2 and 3 again, the fastener 60 includes two restricting plates 61 and four screws 63. Each restricting plate 61 defines two connecting holes 611 for receiving the screws 63.

Each fixing assembly 70 includes a positioning member 71, a latching member 73, a resilient member 75, an adjustment member 77, and two tighteners 79. In the illustrated embodiment, two fixing assemblies 70 are located at opposite ends of the fixing portion 331 of the slave wheel 33, respectively. The positioning member 71 includes two mounting holes 711 and two adjustment holes 713. The latching member 73 includes a first latching block 731 and a second latching block 733. The first latching block 731 defines a first fixing hole 7311, and the second latching block 733 defines a second fixing hole 7331 and an adjustment hole 7333.

The actuator device 80 is a motor, including a main body 81 and a rotating shaft 83 rotatably connected to the main body 81.

Referring to FIGS. 1 through 5 during assembly of the motion transmitting mechanism 100, the rotating shaft 83 is received into the shaft hole 17 of the driving member 10. The positioning portion 51 of the transmission member 50 and the restricting plates 61 of the fastener 60 are fixed in the fixing slot 15 of the driving member 10, and the restricting plates 61 partially covers the positioning portion 51. The screws 63 of the fastener 60 extends through the connecting holes 611 of the restricting plates 61 and the connecting holes 511 of the positioning portion 51, and received in the threaded holes 19 of the driving member 10, thus, connecting the transmission member 50 to the driving member 10. The second coiling belts 533 coil a plurality of windings around the second receiving slots 13 of the driving member 10 and overlap on themselves, respectively, and then coil around one side of the slave wheel 33 of the slave member 30. The first coiling belt 531 coils a plurality of windings around the first receiving slot 11 of the driving member 10 and overlaps itself, and extends the second coiling belts 533, then coils on the other side of the slave wheel 33 of the slave member 30. The positioning member 71 is fixed to the slave member 30 by the tighteners 79 of the fixing assemblies 70 which extends though the mounting holes 711 of the positioning member 71 and are received in the fixing holes 333 of the slave member 30. The adjustment member 77 extends through the resilient member 75 and the adjustment holes 713 of the positioning member 71, and is received in the adjustment holes 7333 of the second latching block 733. Each connecting portion 55 of the transmission member 50 is arranged between one first latching block 731 and one second latching block 733. The tighteners 79 extend though the fixing holes 7311 of the first latching block 731 and are received in the fixing holes 7331 of the second latching block 733 to fix the connecting portion 55 of the transmission member 50. The number of windings of the first coiling belt 531 coiled on the driving member 10 is the same as that of the second coiling belts 533, and is larger than or equals to the transmission ratio of the motion transmitting mechanism 100, thus, deceleration is achieved.

During operation of the motion transmitting mechanism 100, the actuator device 80 rotates the driving member 10, in the illustrated embodiment, the driving member 10 rotates in X direction, which is counterclockwise. When the driving member 10 rotates in the X direction, a portion of the first coiling belt 531 coiled around the first receiving slot 11 of the driving member 10 may be pulled out and coil on the slave wheel 33 of the slave member 30. Friction between the transmission member 50 and the driving member 10 and between the transmission member 50 and the slave wheel 33 rotate the slave wheel 33 opposite to the X direction, and a portion of the second coiling belts 533 coiled around the slave wheel 33 may coil around the second receiving slots 13 of the driving member 10 correspondingly. When the driving member 10 has rotated a default number of windings, the actuator device 80 rotates the driving member 10 opposite to the X direction, and the slave wheel 33 then rotates in the X direction correspondingly. The rotation of the driving member 10 and the slave wheel 33 is the same as described.

The motion transmitting mechanism 100 achieves deceleration using the transmission members 50 coiling around the driving member 10 and the slave member 30. There is no need for a gear wheel or other complicated structures, and the manufacturing cost is lower. The transmission member 50 is a steel belt, for example, thereby increasing the contact area and friction in the transmission process. The transmission member 50 coils around the driving member 10 and overlaps on itself, thus, capable of avoiding bending forces created by spiral coiling and reducing the abrasion of the transmission member 50.

The unsymmetrical structure of the transmission member 50 allows the first coiling belt 531 to be able to extend between the second coiling belts 533, thereby avoiding contact with each other. The positioning portion 51 can be fixed to the driving member 10, capable of avoiding the transmission member 50 moving or sliding during a transmission process.

In addition, elastic force created by the resilient member 75 of the fixing assembly 70 helps to maintain the firmness or snugness of the transmission member 50. When the transmission member 50 becomes loosened, the adjustment member 77 can then be used to further resist the resilient member 55 and restore firmness or tightness.

There may further be any number of first coiling belts and second coiling belts, with the first coiling belt being staggered to the second coiling belt. For example, two first coiling belts and three second coiling belts, and in which one first coiling belt is arranged between two second coiling belts. While, to make sure the first coiling belt and the second coiling belt have substantially the same service life, the number of the first coiling belts may be equal to or one less than the second coiling belts.

Finally, while various embodiments have been described and illustrated, the disclosure is not to be construed as being limited thereto. Various modifications can be made to the embodiments by those skilled in the art without departing from the true spirit and scope of the disclosure as defined by the appended claims.

What is claimed is:

1. A motion transmitting mechanism, comprising:
a driving member;
a slave member;
an actuator device rotating the driving member;
a transmission member comprising a positioning portion and a coiling portion extending from opposite edges of the positioning portion, the positioning portion being fixed to the driving member, the coiling portion coiling a plurality of windings around the driving member and coiling around the slave member; and
a fastener comprising two restricting plates and two screws, wherein the restricting plates covers the positioning portion, and are located at opposite sides of the coiling portion coiling on the driving member, each of the two screws connects one of the two restricting plates to the driving member, and protrudes out relative to the coiling portion coiling on the driving member, thereby limiting the coiling portion coiling on the driving member between the plurality of screws.

2. The motion transmitting mechanism of claim 1, wherein the coiling portion of the transmission member comprises at least one first coiling belt extending from one edge of the positioning portion and at least one second coiling belt extending from the other edge of the positioning portion; the at least one first coiling belt and the at least one second coiling belt are parallel and staggered.

3. The motion transmitting mechanism of claim 2, wherein the number of the at least one first coiling belt is equal to the at least one second coiling belt.

4. The motion transmitting mechanism of claim 2, wherein the number of the at least one first coiling belt is one less than the at least one second coiling belt.

5. The motion transmitting mechanism of claim 4, wherein the coiling portion of the transmission member comprises one first coiling belt arranged between two second coiling belts.

6. The motion transmitting mechanism of claim 5, wherein the driving member defines a first receiving slot and two second receiving slots; the first coiling belt is partially received in the first receiving slot, and the second coiling belts are partially received in the second receiving slot.

7. The motion transmitting mechanism of claim 4, wherein the first coiling belt is wider than the second coiling belt.

8. The motion transmitting mechanism of claim 2, wherein the driving member defines a fixing slot receiving the positioning portion of the transmission member, the two restricting plates are fixed in the fixing slot of the driving member.

9. The motion transmitting mechanism of claim 2, wherein the transmission member further comprises two connecting portions, with one connecting portion being arranged at one end of the at least one first coiling belt away from the positioning portion, and the other connecting portion being arranged at one end of the at least one second coiling belt away from the positioning portion; the motion transmitting mechanism further comprises two fixing assemblies connecting the connecting portion of the transmission member to the slave member.

10. The motion transmitting mechanism of claim 9, wherein each fixing assembly comprises a latching member including a first latching block and a second latching block; each connecting portion of the transmission member is arranged between one first latching block and one second latching block.

11. The motion transmitting mechanism of claim 1, wherein the number of the windings of the coiling portion coiled around the driving member is equal to the transmission ratio.

12. The motion transmitting mechanism of claim 1, wherein the number of the windings of the coiling portion coiled around the driving member is larger than the transmission ratio.

13. The motion transmitting mechanism of claim 1, wherein the transmission member is a steel belt.

* * * * *